United States Patent [19]

Taylor

[11] 4,199,542
[45] * Apr. 22, 1980

[54] CONTINUOUS VULCANIZATION METHOD AND APPARATUS

[75] Inventor: Challen E. Taylor, Portadown, Northern Ireland

[73] Assignee: The Goodyear Tire & Rubber Company, Akron, Ohio

[*] Notice: The portion of the term of this patent subsequent to Oct. 11, 1994, has been disclaimed.

[21] Appl. No.: 863,756

[22] Filed: Dec. 23, 1977

Related U.S. Application Data

[63] Continuation-in-part of Ser. No. 826,097, Aug. 19, 1977, abandoned, which is a continuation of Ser. No. 664,606, Mar. 8, 1976, Pat. No. 4,053,550, which is a continuation-in-part of Ser. No. 506,386, Sep. 16, 1974, abandoned.

[51] Int. Cl.² ............................................. B29H 5/01
[52] U.S. Cl. ..................................... 264/563; 34/155; 264/236; 264/347; 425/325; 425/363
[58] Field of Search ................... 264/347, 236, 234-5, 264/346, 563; 425/325, 363; 34/155

[56] References Cited

U.S. PATENT DOCUMENTS

| 1,415,929 | 5/1922 | Grosvenor | 425/363 |
| 1,543,926 | 6/1925 | Kemp | 264/347 |
| 2,241,856 | 5/1941 | Herrstrom et al. | 264/236 |
| 4,053,550 | 10/1977 | Taylor | 264/347 |

Primary Examiner—Jeffrey R. Thurlow
Attorney, Agent, or Firm—D. M. Ronyak

[57] ABSTRACT

Method and apparatus for continuously vulcanizing unsheathed and unvulcanized elastomeric or plastomeric material by passing the material through an enclosure, within which it is subjected to vulcanizing conditions, in the form of a helix, the helix convolutions in part contacting a drive member and idler member and in part being freely suspended. A resilient elastomeric diaphragm is disposed on the surface of one of the said members.

15 Claims, 5 Drawing Figures

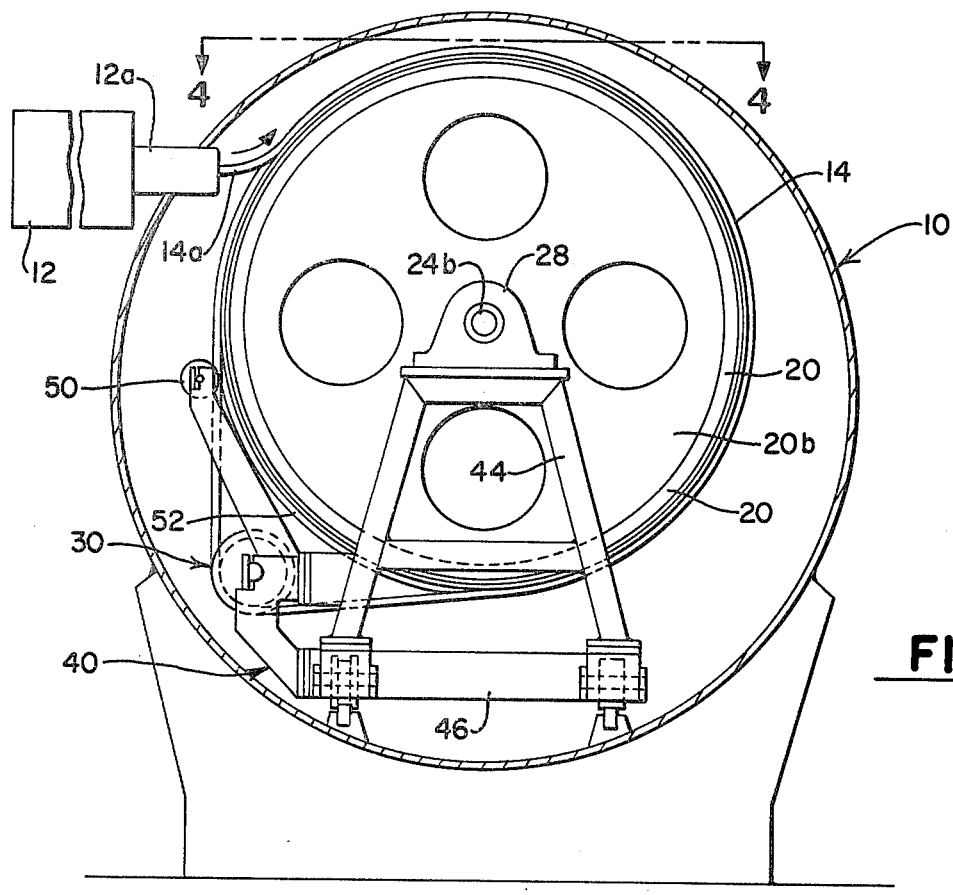
FIG. 3
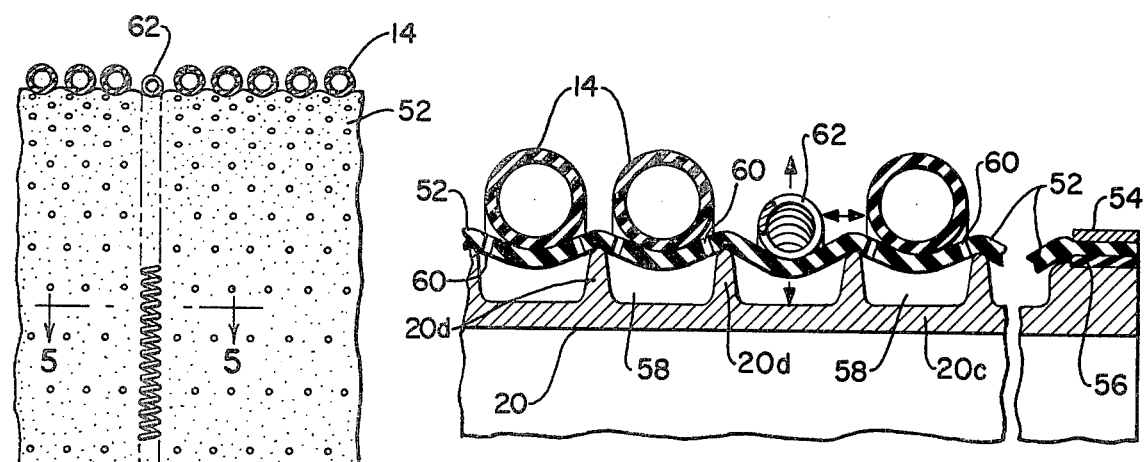
FIG. 4
FIG. 5

CONTINUOUS VULCANIZATION METHOD AND APPARATUS

This is a continuation-in-part of application Ser. No. 826,097 filed Aug. 19, 1977, now abandoned which is a continuation of application Ser. No. 664,606 filed Mar. 8, 1976 now Pat. No. 4,053,550, which is a continuation-in-part of application Ser. No. 506,386 filed Sept. 16, 1974 now abandoned.

This invention generally relates to vulcanization of flexible elastomeric or plastomeric materials or of structures comprising same. In particular, although not exclusively, the invention is directed to a method and apparatus for vulcanizing long lengths of flexible unsheathed and unvulcanized hose formed, for example, by extrusion or by helical winding or both and wherein an unvulcanized hose product is fed into a vulcanization chamber in a continuous manner while simultaneously, completely vulcanized hose product is being drawn out of the chamber at substantially the same rate.

It will be understood from the following discussion that the expression "vulcanized" means subjecting an unvulcanized product to an elevated temperature and pressure for a period of time such as to cause the development of a cross-linked integral structure.

It will further be understood that the expression "continuous" means feeding into the vulcanization atmosphere a length of material on a continuous basis such that while one portion of unvulcanized material is being fed into the chamber, another portion is within the chamber being vulcanized while still another portion of completely vulcanized material is being drawn out of the chamber.

The invention first consists in a method of vulcanizing long lengths of flexible elastomeric or plastomeric hose material in a continuous manner comprising driving an assembled unvulcanized hose product through a vulcanizing atmosphere within a closed chamber without stretching or changing any pre-established structural orientation of reinforcement within the hose, the hose product being driven in the form of a helix having convolutions which in part contact a driving member and in part contact an idler member both of which are mounted within the chamber.

The invention secondly consists in apparatus for continuously vulcanizing long lenghts of elastomeric or plastomeric hose product comprising a horizontal pressure chamber;

means providing a vulcanization atmosphere within the chamber;

pressure retaining inlet means for feeding the hose product into the chamber at a minimum of tension such that any internal orientation of the hose structure is maintained upon entry into the chamber;

pressure retaining outlet means in spaced horizontal relationship to the inlet means for drawing out completely vulcanized hose product from the chamber in synchronism with the amount of hose product entering the chamber at the inlet means;

a driving member and at least one idler member horizontally mounted in parallel spaced-apart positions for rotation within the chamber, the relationship of the driving and idler members being such that portions of helically wound convolutions of hose product contact both members while other portions are free of any contact with either member and completely exposed to the vulcanization atmosphere, the hose product following a helical path about the driving and idler members from the inlet to the outlet;

a resilient diaphragm disposed on the surface of at least one of said members in a manner to support hose product thereon in spaced positions along the length thereof while the other of said members has a contoured surface of substantially concave positions throughout its length such as to accept helical convolutions of hose product from the other of said members and reposition said product on that member in a next successive and advanced helical position, and means connected to said driving member to rotate said member and thus effect movement of the material through the chamber from the inlet to the outlet means.

Various objects and advantages of the invention will become apparent and better appreciated and understood from a consideration of the following description when taken in conjunction with the accompanying drawings in the several figures of which like-reference numerals indicate like-elements and in which:

FIG. 3 is an end view, partially in section, as taken on line 3—3 of FIG. 2;

FIG. 4 is a partial plan view taken on line 4—4 of FIG. 3;

FIG. 5 is a sectional elevational view taken on line 5—5 of FIG. 4.

DESCRIPTION OF THE INVENTION

Figure 1:
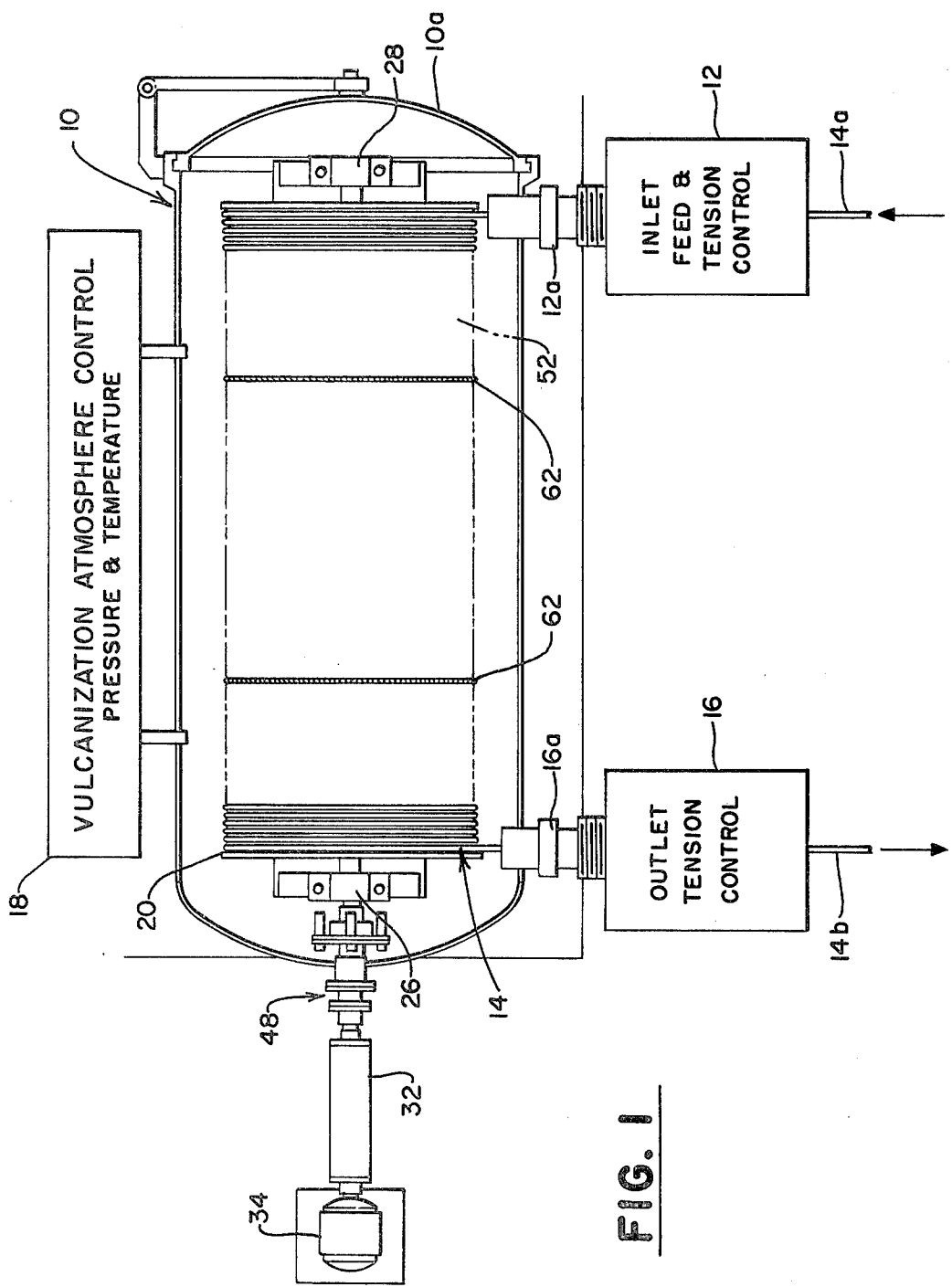
FIG. 1 is a plan view, partially in section and partially diagrammatic of the apparatus comprising the invention.
Figure 2:
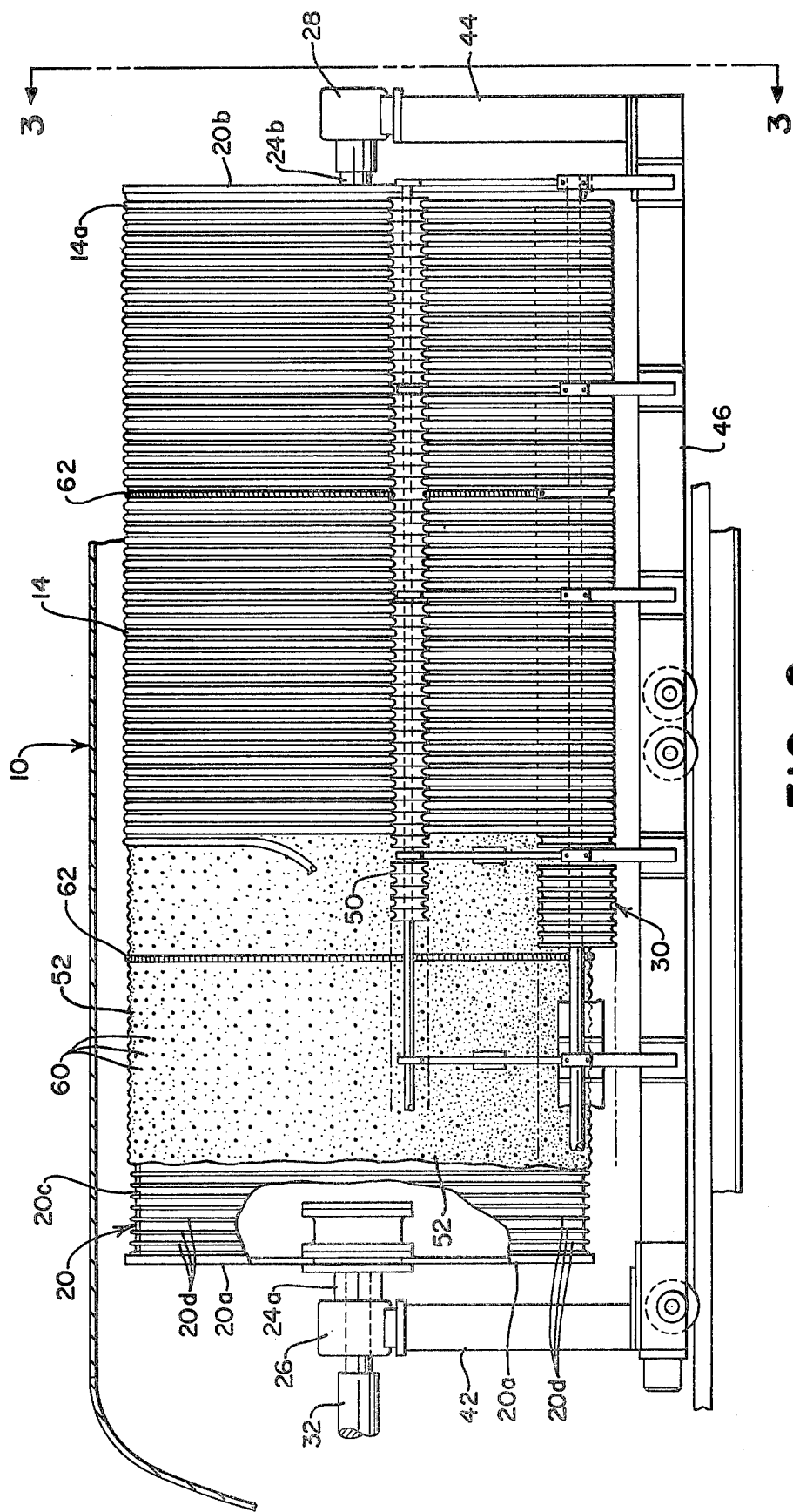
FIG. 2 is a side elevational view, partially in section, of the vulcanization chamber comprising the invention.

Referring to the drawings, FIG. 1 illustrates the apparatus of the invention which generally comprises a vulcanization chamber 10, an inlet feed and tension control mechanism 12 for feeding unvulcanized material 14a into the chamber 10, an outlet control mechanism 16 for drawing out completely vulcanized material 14b, means 18 for providing a vulcanization atmosphere within the chamber 10, a primary rotating member 20 journalled for rotation within the chamber and over which the material 14 moves in a helical path from the inlet to the outlet, an idler member 30 and drive means 34 for effecting rotation of the primary member 20.

In the operation of the above described apparatus, the material to be vulcanized will be a flexible elastomeric or plastomeric hose product 14a which may be fed from a previously assembled store thereof as for example from a supply drum, or it may be a feed of unvulcanized hose product directly from apparatus for the manufacture thereof as for example from the head of an extruder or other final stage manufacturing apparatus. In either circumstance, the hose product is unsheathed, i.e., it is not encased in a lead sheath or covering as is the usual practice in the vulcanization of this type product. The hose may, however, be internally supported by a flexible rubber mandrel or it may be internally pressurized by an air or liquid pressure to resist collapse when in the influence of the vulcanization atmosphere within the chamber 10. Alternatively, the hose product's internal structure may be designed such as to resist collapse and in this case no internal support may be required upon being subjected to the vulcanization atmosphere. The unvulcanized hose product 14a is fed into the inlet feed mechanism 12 which handles it in a manner such that a minimum of tension exists or is imparted to the product as it is fed into the vulcanization chamber 10. That the hose product is fed into the chamber at a minimum of tension is important and it is well known and understood for example in the manufacture of a wire or textile reinforced hose product that the reinforcing be maintained at an approximate angle of 55° with respect to the hose axis upon being vulcanized so as to maintain dimensional stability and to obtain the optimum strength characteristics of the product. Thus, the inlet feed and tension control mechanism 12 operates to feed the unvulcanized hose product into the vulcanization chamber at a minimum of tension as determined by the type of structural reinforcing within the product. This may be accomplished by one of many known methods within the knowledge and skill of persons working in the hose manufacturing art, as for example by tension control pulleys, a caterpillar drive mechanism or the like. The exact mechanism that might be used to accomplish the inlet tension control is beyond the scope of the present invention and therefore will not be specifically described but suffice it to say that the unvulcanized hose product is fed into the chamber and laid onto the primary rotating member 20 within the chamber at a minimum of tension such that the orientation of the structural reinforcing within the product is maintained at the pre-established optimum for the product being vulcanized.

The unvulcanized hose product 14a is fed into the chamber through a pressure seal 12a at the inlet and laid onto the primary rotating member 20 in the form of a helix, the convolutions of the helix moving through the length of the chamber to the outlet that also includes a pressure seal 16a and outlet control mechanism 16. The outlet mechanism 16 may be similar to the inlet feed control mechanism 12 and its purpose is to draw out the completely vulcanized hose product 14b such that the amount of hose product being drawn out of the chamber is in synchronism with the amount of material being fed into the chamber. This synchronism is to maintain a continuous flow of material into and out of the chamber without any build-up within the chamber due to either an increased inlet feed rate or a slower outlet draw rate. Again, the manner of accomplishing synchronism and tension control at the inlet and outlet is considered a matter of preference and within the skill and knowledge of the hose manufacturing art and therefore will not be specifically described.

Referring now to FIGS. 2 through 5, the specific contents of the vulcanization chamber are shown in detail and generally comprise a primary rotating member 20 and an idler member 30. The primary rotating member 20 comprises a drum horizontally journalled within the chamber 10 which may be one of various known constructions within the art but for the purpose of this description is shown as a prefabrication of cast aluminum circular segments 20c that are fastened or welded together to form a right circular cylinder of the desired diameter. The drum has end plates 20a and 20b that support shaft segments 24a and 24b that are bearing mounted at 26 and 28 respectively. One shaft segment 24a is connected to a drive shaft 32 that effects rotation of the drum by reason of a drive motor 34.

An idler rotating member 30 is also mounted in the chamber in a substantially parallel relationship to the drum 20. The mounting of the idler is made to a carriage support generally indicated by reference numeral 40 that also mounts the drum 20 thereon by reason of upright members 42, 44. The idler member may be a series of freely rotating individual pulleys or alternatively a single cylindrical drum having a contoured surface for receiving the hose product therearound or it may be a series of guide members that operate in the manner hereinafter to be described. As clearly evident in FIGS. 2 and 3 the convolutions of the helixed hose product pass around the primary rotating drum 20 as well as the idler 30 and the helical movement of the hose product is essentially effected by the positioning of the idler member. In other words, the idler functions to pick up the hose convolutions from the drum 20 and indexes each to a new advanced and successive position on the surface of the drum. An additional horizontally mounted set of rollers or alternatively a simple bar 50 may be mounted relative to the drum and the idler to keep each of the convolutions of hose in its proper position between the time it leaves the idler and the time it is laid on the drum 20.

FIGS. 4 and 5 illustrate the particular configuration of the drum 20 such as to maintain orientation of the hose convolutions thereon. The segments that comprise the cylindrical drum structure are characterized by annular, radially extending ribs 20d that carry and support a substantially flexible elastomeric diaphragm 52 thereon. The rib spacing is chosen so that the diaphragm which may have a thickness within the range of 0.03 inches to 0.25 inches (0.076 mm to 6.35 mm) flexes inwardly toward the drum and substantially craddles the hose product 14 in a concave groove formed in the diaphragm by reason of the weight of the hose product. The diaphragm 52 covers the total surface of the drum and is fastened at each end 20a, 20b by stainless steel band clamps 54 that are tightened circumferentially about the diaphragm and drum. Compensation of the differences in expansion of the stainless steel band 54 and the aluminum drum 20 is accomplished by an additional rubber ply 56 positioned beneath the stainless band. The compound of the ply 56 is chosen such as to allow for the difference in expansion and contraction of the two metals while maintaining sufficient band pressure on the diaphragm to keep it from loosening on the drum. Of course other means may be used to fasten down the diaphragm and the invention is not considered limited to any particular type method or fastening means.

Because the diaphragm 52 is suspended across the ribs 20d, a space 58 is created between it and the drum 20. In this circumstance, a plurality of breather holes 60 are provided in the diaphragm to equalize any differences in pressure that may occur between the volume of the space 58 and the atmosphere of the chamber 10. The holes also serve to drain accumulated condensate in the space 58 that would tend to cause sagging of the diaphragm at the bottom position of the drum. The holes 60 may be punched or molded into the diaphragm at regular or random intervals across its surface and the number of such holes is a matter of choice depending on their size, the spacing of the ribs 20d, and the amount of condensate that may accumulate.

In addition and because of the large drum diameter (approximately 10 feet) and its long length (approximately 20 feet), the flexible diaphragm may be held to the drum by additional stainless steel bands mounted in the same manner as the end bands 54 or alternatively, the diaphragm may be held in place by coil springs 62 that are bound circumferentially about the diaphragm and positioned between two ribs 20d as shown in FIG. 5. It will be appreciated that the spring 62, while effectively holding the diaphragm to the drum, also provides a tensioning device as the diaphragm tends to expand and/or contract due to the chamber atmosphere while the hose product is being transported helically on its surface. Tensioning of the diaphragm also compensates for any variation in the diaphragm diameter and in any possible variations in the length of the hose convolutions in adjacent positions on the drum. It is, of course, contemplated that other tensioning means may be provided at one or both ends of the drum which impart a longitudinal tension to the diaphragm and it is also contemplated that the amount of such tension may be adjusted by a particular choice of springs 62 or any other device or means capable of being affixed to the drum 20.

The apparatus within the chamber 10 are mounted on a tracked platform or carriage 46 that may be withdrawn from the chamber by reason of an end door opening 10a and a disconnect assembly 48 on the drive shaft 24a of the drum. Thus, upon removal from the chamber, the drum may be serviced and upon an initial start up of the vulcanization process, a lead line may be threaded about the drum in the helical path to be followed by the hose product. This is necessary inasmuch as the system is obviously not self-threading or self-feeding at start up.

While certain representative embodiments and details have been shown for the purpose of illustrating the invention, it will be apparent to those skilled in this art that various changes and modifications may be made therein without departing from the spirit or scope of the invention.

I claim:

1. Apparatus for continuously vulcanizing long lengths of unsheathed and unvulcanized elastomeric or plastomeric hose product comprising:
   a horizontal pressure chamber;
   means providing a vulcanization atmosphere within the chamber;
   pressure retaining inlet means for feeding the hose product into the chamber at a minimum of tension such that any internal orientation of the hose structure is maintained upon entry into the chamber;
   pressure retaining outlet means in spaced horizontal relationship to the inlet means for drawing out completely vulcanized hose product from the chamber in synchronism with the amount of hose product entering the chamber at the inlet means;
   a driving member and at least one idler member horizontally mounted in parallel spaced apart positions for rotation within the chamber, the relationship of the driving and idler members being such that portions of helically wound convolutions of hose product contact both members while other portions are free of any contact with either member and completely exposed to the vulcanization atmosphere, the hose product following a helical path about the driving and idler members from the inlet to the outlet;
   a resilient diaphragm disposed on the surface of at least one of said members in a manner to support hose product thereon in spaced positions along the length thereof while the other of said members has a contoured surface of substantially concave positions throughout its length such as to accept helical convolutions of hose product therein and reposition said product on the diaphragm in a next successive and advanced helical position, and
   means connected to said driving member to rotate said member and thus effect movement of the material through the chamber from the inlet to the outlet means.

2. Apparatus as set forth in claim 1 wherein the resilient diaphragm is disposed on the surface of the driving member.

3. Apparatus as set forth in claim 1 wherein the resilient diaphragm is disposed on the surface of the idler member.

4. Apparatus as set forth in claim 2 wherein the diameter of the driving member is substantially greater than the diameter of the idler member, said driving member comprised of a cylindrical drum having a plurality of substantially closely spaced, radially extending ribs on the surface thereof, and the diaphragm is supported across the surface of the drum by the ribs such that the hose product laid on the drum is cradled by the diaphragm between adjacent ribs.

5. Apparatus as set forth in claim 4 wherein the diaphragm has a plurality of holes therein located in spaced positions across the entire surface thereof to provide pressure equalization between the area enclosed by the diaphragm and the drum and the chamber atmosphere while also providing escape ports for accumulated condensation upon rotation of the driving member.

6. Apparatus as set forth in claim 5 wherein the diaphragm has a thickness within the range of 0.03 inches (0.076 mm) and 0.250 inches (6.35 mm).

7. Apparatus as set forth in claim 6 further including tensioning means associated with the diaphragm to maintain tension within the diaphragm along the length of the drum.

8. Apparatus as set forth in claim 7 wherein the tensioning means comprises at least one continuous circular spring mounted circumferentially about the diaphragm between adjacent ribs of the drum.

9. Apparatus as set forth in claim 7 wherein the tensioning means comprises means mounted on at least one end of the drum and fastened to the diaphragm such as to exert longitudinal tension to the diaphragm.

10. Apparatus as set forth in claim 4 wherein the idler member comprises a plurality of adjacent pulleys positioned relative to the drum such as to pick up the material coming off of the driving member in one position and lay it back on the driving member in the next successive or advanced position of its helical path along the length of said driving member.

11. Apparatus as set forth in claim 4 wherein the idler member comprises a single drum having a contoured surface such as to pick up the material coming off of the driving member in one position and lay it back on the driving member in the next advanced position of its helical path along the length of said driving member.

12. The apparatus as set forth in claim 11 wherein the contoured surface is that of a helix.

13. A method of continuously vulcanizing long lengths of flexible unvulcanized elastomeric or plastomeric material by passing said material in a continuous manner through a chamber having a vulcanization atmosphere therein, the method comprising the steps of:
   feeding a substantially continuous long length of unvulcanized material into the chamber through an inlet that provides a sufficient pressure seal while also moving the material into the chamber at a minimum of tension such that the structural orientation of the material is substantially unaffected;

providing a horizontally positioned rotary driving member and at least one parallel spaced idler member within the chamber the surface of one of said members having a resilient elastomeric diaphragm disposed on its surface for receiving the continuous material thereon while the other of said members has a contoured surface to position the material in successive positions along the length of the diaphragm disposed on the opposite member;

winding the material in a substantially helical path about both driving and idler members such that convolutions of the material contact both members while portions thereof are free of contact with either member and completely exposed to the vulcanization atmosphere within the chamber;

drawing completely vulcanized material out of the chamber through an outlet that provides a sufficient pressure seal while also maintaining synchronism with the amount of material being fed into the chamber at the inlet; and driving said driving member to move the material through the chamber in a continuous moving helical path from the inlet to the outlet.

14. The method as set forth in claim 13 wherein the material is an unsheathed, mandrel-supported elastomeric hose.

15. The method as set forth in claim 13 wherein the material is an unsheathed elastomeric hose, unsupported by any mandrel and having an internal pressure such as to resist collapse while in the influence of the vulcanization atmosphere.

* * * * *